United States Patent

Hoshina et al.

(10) Patent No.: US 12,489,969 B2
(45) Date of Patent: Dec. 2, 2025

(54) IMAGE CAPTURING APPARATUS, CONTROL METHOD THEREFOR, AND STORAGE MEDIUM STORING CONTROL PROGRAM THEREFOR

(71) Applicant: CANON KABUSHIKI KAISHA, Tokyo (JP)

(72) Inventors: Takayuki Hoshina, Kanagawa (JP); Hiroshi Toriumi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 72 days.

(21) Appl. No.: 18/648,543

(22) Filed: Apr. 29, 2024

(65) Prior Publication Data

US 2024/0406546 A1    Dec. 5, 2024

(30) Foreign Application Priority Data

May 30, 2023   (JP) .................................. 2023-088764

(51) Int. Cl.
*H04N 23/60* (2023.01)
*H04N 23/61* (2023.01)
*H04N 23/63* (2023.01)
*H04N 23/667* (2023.01)

(52) U.S. Cl.
CPC ............. *H04N 23/64* (2023.01); *H04N 23/61* (2023.01); *H04N 23/632* (2023.01); *H04N 23/667* (2023.01)

(58) Field of Classification Search
CPC ...... H04N 23/64; H04N 23/61; H04N 23/632; H04N 23/667; H04N 23/611

USPC ....................................................... 348/222.1
See application file for complete search history.

(56) References Cited

U.S. PATENT DOCUMENTS

| | | | |
|---|---|---|---|
| 2009/0167883 A1* | 7/2009 | Nozaki | G06T 1/0007 |
| | | | 348/222.1 |
| 2011/0310269 A1* | 12/2011 | Shiohara | H04N 5/06 |
| | | | 348/222.1 |
| 2014/0125839 A1* | 5/2014 | Shiohara | H04N 23/73 |
| | | | 348/229.1 |
| 2022/0321761 A1* | 10/2022 | Okubo | H04N 23/745 |

FOREIGN PATENT DOCUMENTS

JP      2002252804 A    9/2002

\* cited by examiner

*Primary Examiner* — Usman A Khan
(74) *Attorney, Agent, or Firm* — Cowan, Liebowitz & Latman, P.C.

(57) ABSTRACT

An image capturing apparatus capable of reducing a loss of a desired image capturing opportunity. The image capturing apparatus includes an image capturing unit that outputs image data, a memory device, and a processor. In a first operation mode in an pre-capturing mode, the processor displays the image data as a live view image on a display unit, holds pre-capture image data from detection of a first instruction instructing image capturing preparation to detection of a second instruction instructing recording of a captured image, and records main image data output in response to the second instruction and the held pre-capture image data in a recording medium when the second instruction is detected. In a second operation mode in the pre-capturing mode, the processor stops displaying the live view image, detects a change of an object based on the image data, and holds the image data based on a detection result.

17 Claims, 7 Drawing Sheets

FIRST AREA AR1   SECOND AREA AR2

FIRST AREA AR1   SECOND AREA AR2

IMAGE CAPTURING APPARATUS, CONTROL METHOD THEREFOR, AND STORAGE MEDIUM STORING CONTROL PROGRAM THEREFOR

BACKGROUND OF THE INVENTION

Field of the Invention

The present invention relates to an image capturing apparatus, a control method therefor, and a storage medium storing a control program therefor.

Description of the Related Art

A conventional electronic apparatus, such as a digital camera, having an image capturing function has a release switch operated by pressing a release button. A time lag occurs from when a user presses the release button to instruct the electronic apparatus to capture an image until an image capturing is actually started. Therefore, it may be difficult to capture an image at a timing desired by the user. In view of this, Japanese Patent Laid-Open Publication No. 2002-252804 discloses an electronic camera having a pre-capture function. A release switch of the electronic camera described in this publication is a two-step switch that corresponds to a two-step operation of a release button. The pre-capture function repeatedly captures images while the release button is pressed in the first step, and the images captured repeatedly are stored in a buffer memory. When the release button is pressed in the second step after the release button is pressed in the first step, an image captured at the time of pressing the release button in the second step and the images stored in the buffer memory are stored in the recording medium. With such a pre-capture function, it is possible to record an image prior to a moment when the user instructs the image capturing, and thus it is possible to easily capturing an image at a timing desired by the user.

The electronic camera described in the above publication is capable of live view image capturing in which a captured image is displayed as a through image on a display monitor. The user can instruct the image pre-capturing after visually recognizing an object in the live view image capturing. In the meantime, when the user is operating a setting screen or a playback screen on the display monitor, the user cannot visually recognize an object on the display monitor, and cannot instruct image capturing at an appropriate timing. Therefore, the user cannot recognize a change in the object that has occurred during the operation of the setting screen or the playback screen, and as a result, there is a problem in that the user misses an opportunity to instruct image pre-capturing at a desired timing.

SUMMARY OF THE INVENTION

The present invention provides an image capturing apparatus, a control method therefor, and a storage medium storing a control program therefor, which are capable of reducing a loss of a desired image capturing opportunity even when a user is performing an operation (for example, an operation of a playback screen for reproducing an image) different from an image capturing operation.

Accordingly, an aspect of the present invention provides an image capturing apparatus including an image capturing unit configured to output image data, a memory device that stores a set of instructions, and at least one processor that executes the set of instructions to, in a first operation mode in an pre-capturing mode, display image data sequentially output from the image capturing unit as a live view image on a display unit, hold pre-capture image data output from the image capturing unit during a period from detection of a first instruction instructing image capturing preparation to detection of a second instruction instructing recording of a captured image, and record main image data output from the image capturing unit in response to the second instruction and the held pre-capture image data in a recording medium when the second instruction is detected, in a second operation mode in the pre-capturing mode, stop displaying the live view image on the display unit, detect a change of an object based on the image data, and hold the image data output from the image capturing unit based on a detection result.

According to the present invention, it is possible to reduce the loss of a desired image capturing opportunity even when the user is performing an operation (for example, an operation of a playback screen for reproducing an image) different from the image capturing operation.

Further features of the present invention will become apparent from the following description of exemplary embodiments with reference to the attached drawings.

DESCRIPTION OF THE EMBODIMENTS

Figure 1:
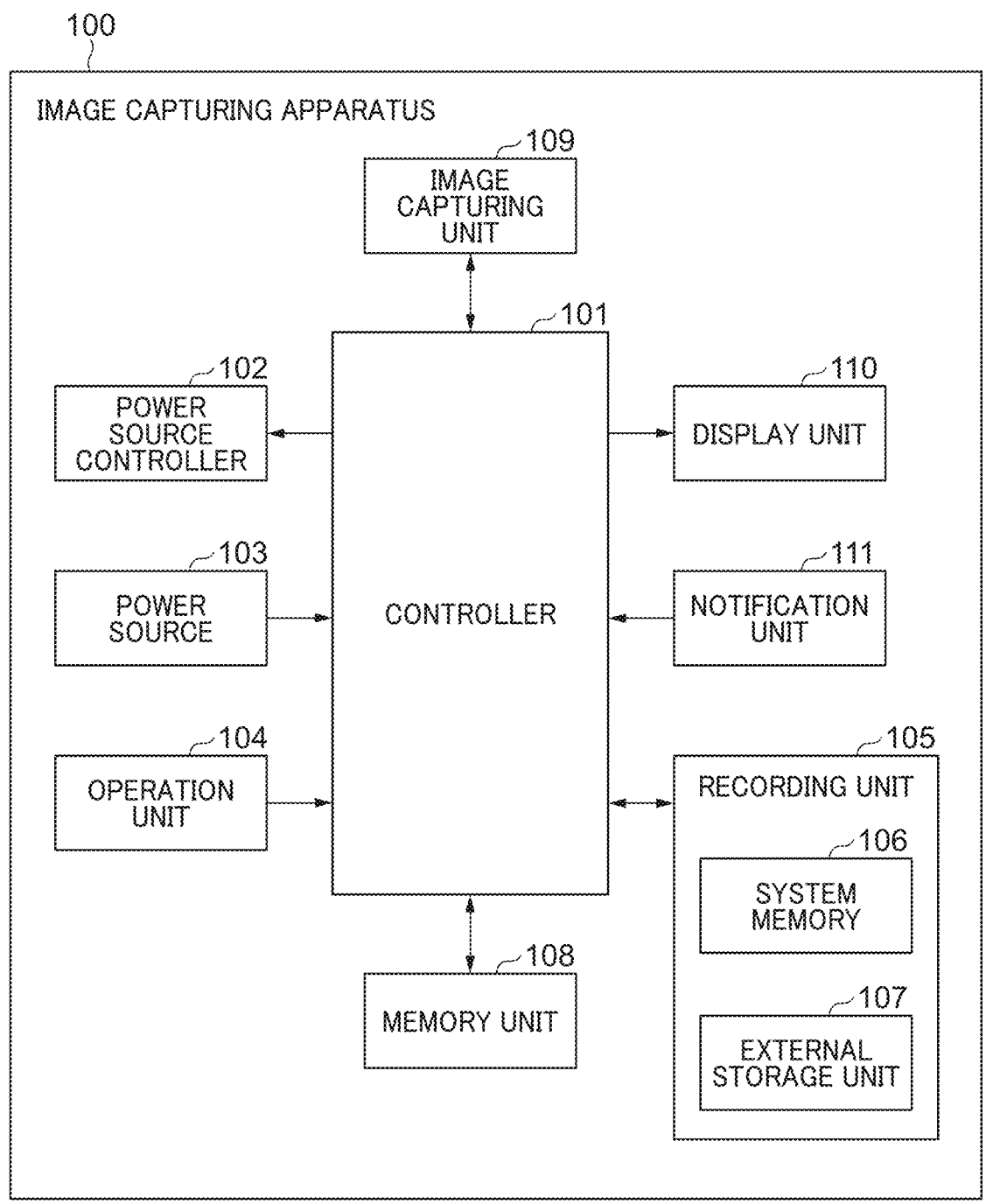
FIG. 1 is a block diagram showing a hardware configuration of an image capturing apparatus according to a first embodiment.

Hereafter, embodiments according to the present invention will be described in detail by referring to the drawings. However, the configurations described in the following embodiments are merely examples, and the scope of the present invention is not limited by the configurations described in the embodiments. For example, each unit constituting the present invention can be replaced with any configuration capable of exhibiting the same function. In addition, an arbitrary constituent may be added. Any two or more configurations (features) of the embodiments can be combined.

Hereinafter, a first embodiment will be described with reference to FIG. 1 to FIG. 4B. FIG. 1 is a block diagram showing a hardware configuration of an image capturing apparatus according to the first embodiment. An image capturing apparatus 100 shown in FIG. 1 is, for example, a digital camera. A user can select an image pre-capturing mode for recording an image (a pre-capture image) before main image capturing in the image capturing apparatus 100. When the image pre-capturing mode is selected, a first operation mode and a second operation mode, which will be described later, can be selected. The image capturing apparatus 100 includes a controller 101, a power source controller 102, a power source 103, an operation unit 104, a recording unit 105, a memory unit 108, an image capturing unit 109, a display unit 110, and a notification unit 111. These elements constituting the image capturing apparatus 100 are communicably connected to each other. The recording unit 105 includes a system memory (a first recording section) 106 and an external storage unit (a second recording section) 107.

The controller 101 is a computer including at least one processor and controls the entire image capturing apparatus 100 that includes the power source controller 102 to the notification unit 111 (a control step). The controller 101 reads a program for controlling the image capturing apparatus 100 from the memory unit 108 and develops a part of the program onto the system memory 106. Thus, the controller 101 can control the entire image capturing apparatus 100.

The power source controller 102 is configured by, for example, a battery detection circuit, a protection circuit, a power detection circuit, a DC-DC converter, an LDO regulator, etc. The power source controller 102 converts a voltage supplied from the power source 103 into a desired voltage and supplies the voltage to each of the elements. In a case where the power source 103 is a battery, the power source controller 102 has a determination function of determining a presence of the battery and a type of the battery. The power source controller 102 has a protection function of protecting the elements connected to the power source controller 102 by cutting off the power supply unit 103 when an abnormal state, such as overcurrent, is detected. The power source controller 102 has an electric energy detection function capable of detecting electric energy supplied to each of the elements. The power source 103 is constituted by a secondary battery, such as a NiCd battery, a NiMH battery, or a Li battery, or an AC adapter, for example. The power source 103 can obtain a remaining battery level and notify the controller 101 of the remaining battery level.

The operation unit 104 is an operation means for a user to input various predetermined operation instructions to the controller 101. The operation unit 104 includes at least one of a switch or a button operated by pressing, a dial operated by rotation, a touch panel, a voice recognition device, etc. In this embodiment, the operation unit 104 includes a release button (an operation member operated by pressing) for operating a release switch. The release switch is configured to correspond to a two-step press operation of the release button, that is, is configured as a two-step switch including a first release switch for instructing image capturing preparation and a second release switch for instructing recording of a captured image. Then, the first release switch turns ON when the release button is pressed in the first step. Thus, a predetermined first instruction is output to the controller 101. In this embodiment, when the first instruction is detected, the controller 101 can cause the image capturing unit 109 to capture temporally continuous pre-capture images during the first instruction is being detected. Further, the second release switch turns ON when the release button is pressed in the second step. Thus, a predetermined second instruction different from the first instruction is output to the controller 101.

In this embodiment, the controller 101 can cause the image capturing unit 109 to capture a main captured image at a time point when the second release switch is turned ON in a case where the second instruction is detected following the first instruction during capturing of pre-capture images. In addition, along with this image capturing, the controller 101 can cause the recording unit 105 to record the main captured image and the pre-capture images.

As described above, the user can switch the operation mode of the image capturing apparatus 100 between the first operation mode and the second operation mode. In the first operation mode, the controller 101 captures a pre-capture image and a main image in response to the operation of the release button by the user. That is, in the first operation mode, the image capturing unit 109 is controlled to generate still image data of a pre-capture image at a predetermined interval from the detection of the first instruction until the detection of the second instruction. Thereafter, the controller 101 controls to capture a main image in detecting the second instruction and to record the pre-capture image (still image data) and the main image in the recording unit 105.

In the second operation mode, the controller 101 performs control to generate still image data of a pre-capture image at a predetermined interval based on state information (a detection result) about the main object without depending on the operation of the release button by the user. In this embodiment, a moving amount of the main object is used as the state information about the main object.

The recording unit 105 can record images captured by the image capturing unit 109. The recording unit 105 includes the system memory 106 and an external storage unit 107. The system memory 106 is configured by, for example, a RAM. A program read from the memory unit 108, constants, variables, etc. for the operation of the controller 101 are developed onto the system memory 106. The system memory 106 can temporarily record a pre-capture image in the first operation mode. Then, when the system memory 106 becomes full, that is, when a free space becomes insufficient, for example, the oldest pre-capture image among the pre-capture images recorded in the system memory 106 is deleted. The buffer memory area in which new pre-capture images can be sequentially recorded is secured in the system memory 106 by the capacity of the deleted pre-capture images.

The external storage unit 107 is configured by a detachable recording medium, such as a semiconductor memory, for example, and can record the main captured image and the pre-capture image in the second operation mode. The memory unit 108 includes a nonvolatile memory that can be electrically erased and programed, and is configured by a ROM. The memory unit 108 stores constants, programs, etc. for the operation of the controller 101. The programs are not particularly limited, and include, for example, a program for causing the controller 101 to execute the units or steps (a control method for the image capturing apparatus) of the image capturing apparatus 100.

The image capturing unit 109 includes an image sensor, such as a CMOS or a CCD, and can output image data in response to an instruction from the controller 101. The image data captured by the image capturing unit 109 is transmitted to the controller 101. The image capturing unit 109 can take a first image capturing state and a second image capturing state in which image capturing conditions (image pre-capturing parameters) at the time of the image pre-capturing are different from each other.

In the first image capturing state, at least one of the image capturing conditions, such as recording image quality of the image pre-capturing, a frame rate of the image pre-capturing, and the maximum number of storable pre-capture images, is reduced as compared with in the second image capturing state. Therefore, the first image capturing state can reduce power consumption during the image pre-capturing than the second image capturing state.

For example, when the recording image quality is reduced, the size of the image read from the image capturing unit 109 per one frame can be reduced. This can reduce the power consumption of the image capturing unit 109 that obtains image data, the power consumption of the controller 101 that applies a process to the image data obtained by the image capturing unit 109, and the power consumption of the external storage unit 107 that records the image data after the main image capturing.

In addition, when the frame rate is reduced, the number of images captured per unit time can be reduced. This can reduce the power consumption of the image capturing unit 109, the controller 101, and the external storage unit 107, as with the above description. Further, when the maximum number of storable pre-capture images is reduced, the number of pre-capture images held in the system memory 106 can be reduced. This can reduce the power consumption of the external storage unit 107 during recording.

The display unit 110 is configured by a combination of an EVF, an LCD, LEDs, etc., and can display various kinds of information, such as characters and images. In the first operation mode, the display unit 110 is in a live view state in which a live view image captured by the image capturing unit 109 is displayed. In the second operation mode, the display unit 110 is in a non-live-view state in which the display of the live view image is restricted, that is, the live view image is not displayed.

The display unit 110 may not be provided in the image capturing apparatus 100. In this case, the display unit 110 is configured as a display device different from the image capturing apparatus 100. The other display device and the image capturing apparatus 100 are communicably connected to each other.

The notification unit 111 includes at least one of a light emitting unit, such as an LED, that emits light, a sound emitting unit, such as a loud speaker, that generates sound, and a vibration unit, such as a piezoelectric element, that generates vibration. The notification unit 111 can call attention, that is, notify the user who uses the image capturing apparatus 100 by generating at least one of light, sound, and vibration.

Figure 2:
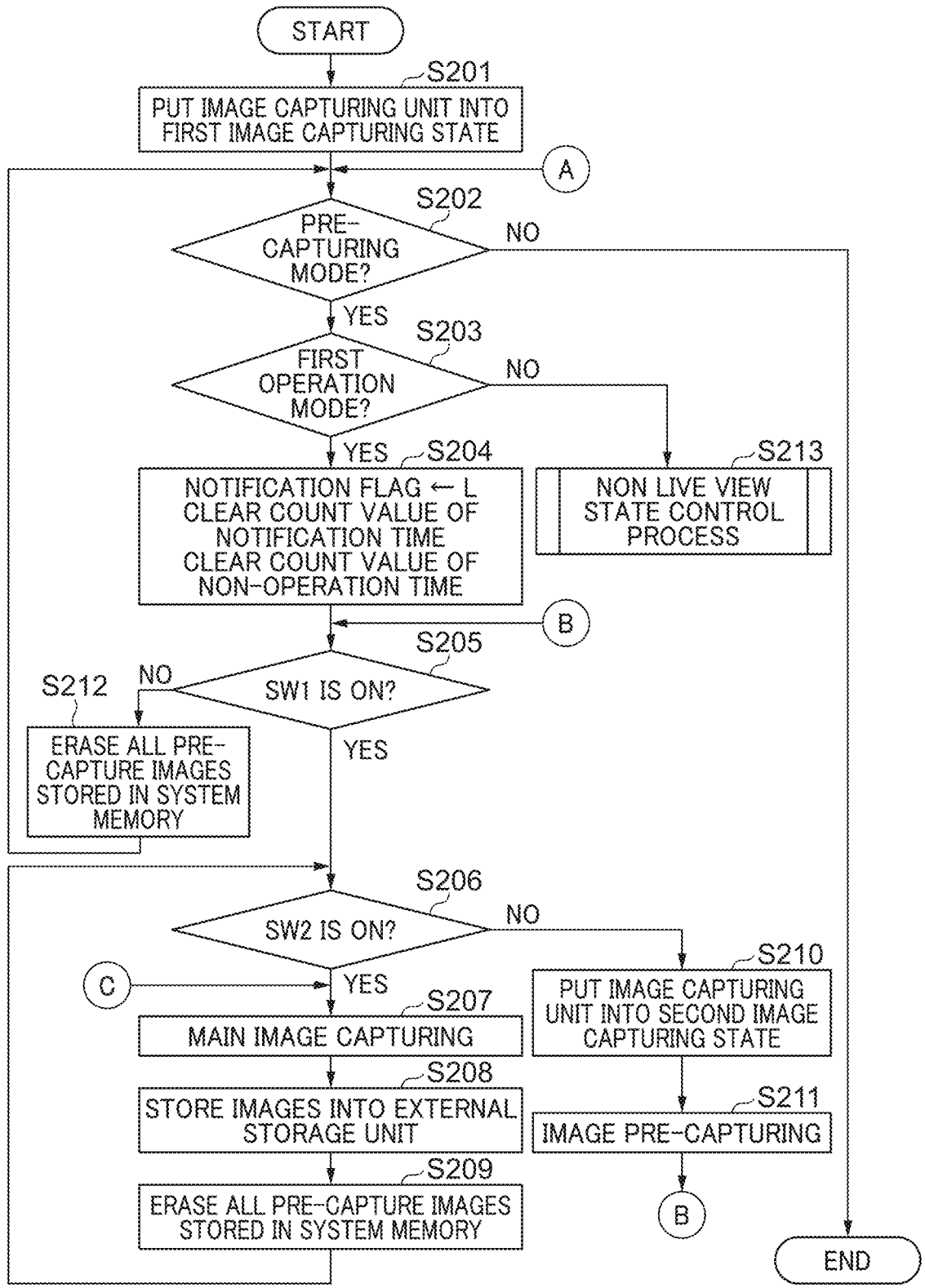
FIG. 2 is a flowchart showing a process performed in the image capturing apparatus shown in FIG. 1.

FIG. 2 is a flowchart showing a process performed in the image capturing apparatus shown in FIG. 1. Each process in the flowchart shown in FIG. 2 is achieved by the controller 101 of the image capturing apparatus 100 developing a program stored in the memory unit 108 onto the system memory 106 and executing the program to control each functional block. As shown in FIG. 2, the controller 101 puts the image capturing unit 109 into the first image capturing state in a step S201. Thus, the image capturing unit 109 can perform image pre-capturing in the first image capturing state.

In a step S202, the controller 101 determines whether the pre-capturing mode is set. When it is determined in the step S202 that the pre-capturing mode is set, the process proceeds to a step S203. In the meantime, when it is determined in the step S202 that the pre-capturing mode is not set, the process is terminated.

In the step S203, the controller 101 determines whether the operation mode is the first operation mode, that is, whether the display unit 110 is in the live view state (first operation mode) or the non-live-view state (second operation mode). In the case where it is determined in the step S203 that the operation mode is the first operation mode (live view state), the process proceeds to a step S204. In the meantime, in the case where it is determined in the step S203 that the operation mode is not the first operation mode, that is, the operation mode is the second operation mode (non-live-view state), the process proceeds to a step S213.

In the step S204, the controller 101 sets a notification flag described later to an L level and clears count values of non-operation time and notification time described later.

In a step S205, the controller 101 determines whether the first release switch (SW1) is ON as a result of the press of the release button of the operation unit 104 in the first step. When it is determined in the step S205 that the first release switch is ON, the process proceeds to a step S206. In the meantime, when it is determined in the step S205 that the first release switch is not ON, the process proceeds to a step S212.

In the step S206, the controller 101 determines whether the second release switch (SW2) is ON as a result of the press of the release button of the operation unit 104 in the second step. When it is determined in the step S206 that the second release switch is ON, the process proceeds to a step S207. In the meantime, when it is determined in the step S206 that the second release switch is not ON, the process proceeds to a step S210.

In the step S207, the controller 101 performs main image capturing by the image capturing unit 109. The "main image capturing" is a normal single image capturing different from the pre-capturing, and means capturing an image of one frame.

In a step S208, when the pre-capture images are recorded in the system memory 106, the controller 101 stores the pre-capture images and the main captured image obtained in the step S207 into the external storage unit 107.

In a step S209, the controller 101 erases the pre-capture images recorded in the system memory 106.

In the step S210 after executing the step S206, the controller 101 puts the image capturing unit 109 into the second image capturing state. Thus, the image capturing unit 109 can perform image pre-capturing in the second image capturing state.

In a step S211, the controller 101 captures a pre-capture image by the image capturing unit 109. In the first operation mode, while the ON state of the first release switch of the operation unit 104 is detected and the ON state of the second release switch is not detected, the image pre-capturing operation is continuously performed, and the pre-capture images up to the maximum number of storable pre-capture images are temporarily recorded in the system memory 106.

When the number of pre-capture images reaches the maximum number of storable pre-capture images, the controller 101 deletes the oldest pre-capture image among the pre-capture images recorded in the system memory 106. Thus, a new pre-capture image can be recorded in the system memory 106. The case where the number of pre-capture images reaches the maximum number of storable pre-capture images is not particularly limited. For example, a case where the system memory 106 becomes full can be applied. Other examples include a case where the number of pre-capture images has reached the number of images preset in the system memory 106, and a case where the number of pre-capture images has reached the number of images that can be appropriately set by the user. After executing the step S211, the process returns to the step S205, and the subsequent steps are sequentially executed.

In the step S212 after executing the step S205, the controller 101 deletes all the pre-capture images recorded in the system memory 106. After executing the step S212, the process returns to the step S202, and the subsequent steps are sequentially executed.

In the step S213, the controller 101 executes non-live-view state control. The process (non-live-view state control) in the step S213 will be described with reference to FIG. 3.

Figure 3:
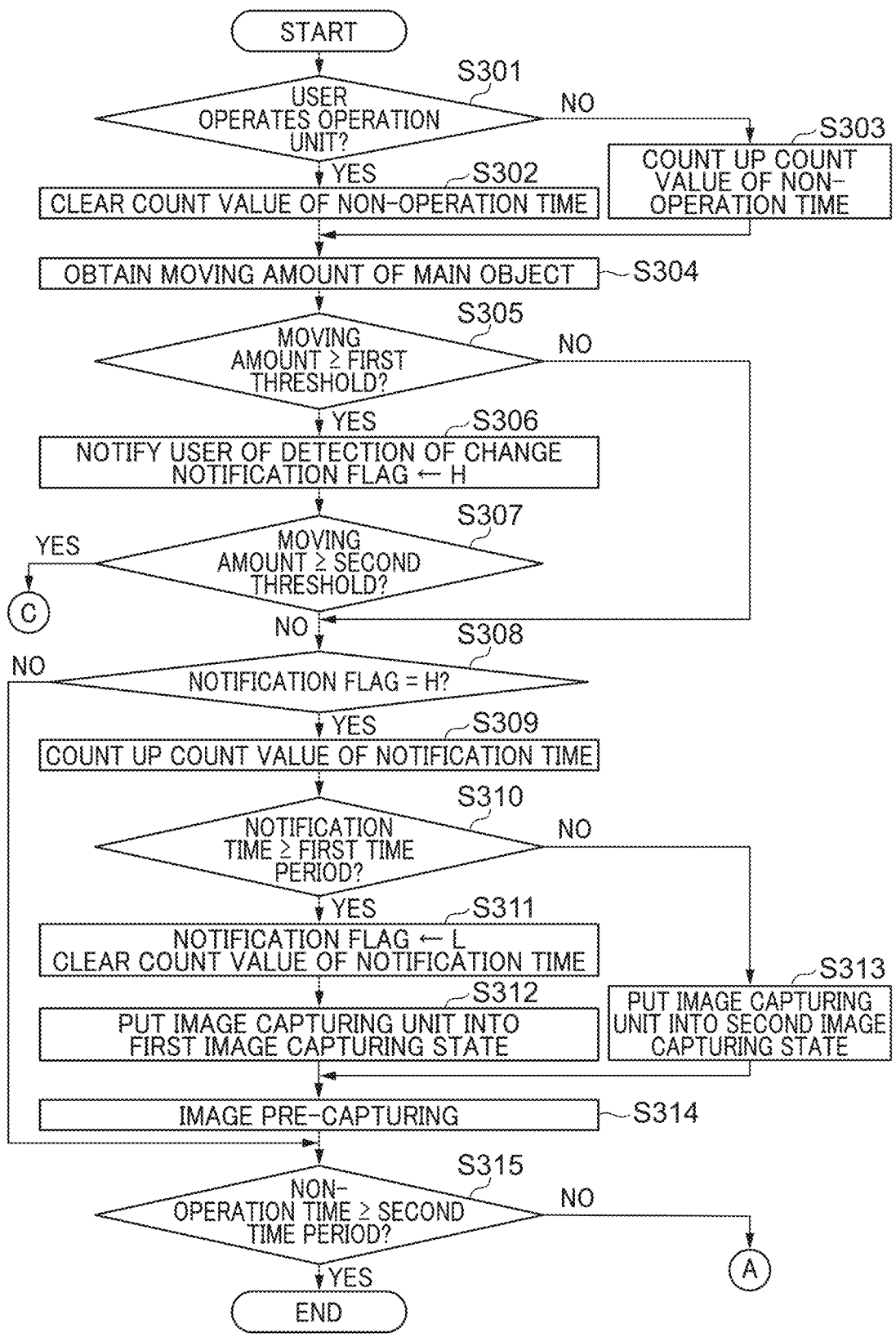
FIG. 3 is a flowchart showing a process in a step S213 (subroutine) of the flowchart shown in FIG. 2.

FIG. 3 is a flowchart showing the process in the step S213 (a subroutine) of the flowchart shown in FIG. 2. As shown in FIG. 3, the controller 101 determines whether the operation unit 104 is operated by the user in a step S301. When it is determined in the step S301 that the operation unit 104 is operated, the process proceeds to a step S302. In the meantime, when it is not determined in the step S301 that the operation unit 104 is operated, the process proceeds to a step S303.

In the step S302, the controller 101 clears the count value of the non-operation time. The "non-operation time" is a period during which the user does not operate the operation unit 104. After executing the step S302, the process proceeds to a step S304.

In the step S303, the controller 101 counts up the count value of the non-operation time. After executing the step S303, the process proceeds to the step S304.

In the step S304, the controller 101 detects a state change (a moving amount) of a main object in the image based on the images obtained by the image capturing unit 109, and obtains (outputs) state information regarding the state change. As described above, in this embodiment, the controller 101 has a function of a detection unit to detect the state information about the main object. The image capturing apparatus 100 may have a section functioning as the detection unit separately from the controller 101.

In a step S305, the controller 101 determines whether the state change is equal to or more than a first threshold described later, that is, whether the moving amount of the main object is equal to or more than the first threshold, based on the state information about the main object obtained in the step S304. When it is determined in the step S305 that the state change is equal to or more than the first threshold, the process proceeds to a step S306. In the meantime, when it is determined in the step S305 that the state change is not equal to or more than the first threshold, the process proceeds to a step S308.

In the step S306, the controller 101 controls the notification unit 111 to notify the user that the change of the main object more than the first threshold is detected. As described above, the notification unit 111 may generate at least one of light, sound, and vibration. The notification in the step S306 is performed by at least one of light, sound, and vibration generated by the notification unit 111. This notification can prompt the user to return the display unit 110 to the live view state when the display unit 110 is in the non-live-view state and the user is viewing a display other than the live view screen, such as the setting screen or the playback screen. When the display unit 110 is returned to the live view state, it is possible to reduce a loss of an image capturing opportunity at a desired timing. In the step S306, the controller 101 sets a notification flag to an H level. The "notification flag" is one of determination materials for the controller 101 to switch the image capturing state of the pre-capture image between the first image capturing state and the second image capturing state after the notification is given to the user as described later.

In a step S307, the controller 101 determines whether there is a change equal to or more than a second threshold, which is more than the first threshold, that is, whether the moving amount of the main object is equal to or more than the second threshold, based on the state information about the main object obtained in the step S304. When it is determined in the step S307 that the change is equal to or more than the second threshold, the process proceeds to the step S207 (see FIG. 2). In this way, when the change equal to or more than the second threshold is detected in the step S307 after the change equal to or more than the first threshold is detected in step S305 via the step S306, the main image is captured in the step S207 and the main captured image and the pre-capture images are stored in the step S208 (see FIG. 2). In the meantime, when it is determined in the step S307 that there is no change equal to or more than the second threshold, the process proceeds to the step S308.

Figure 4A:
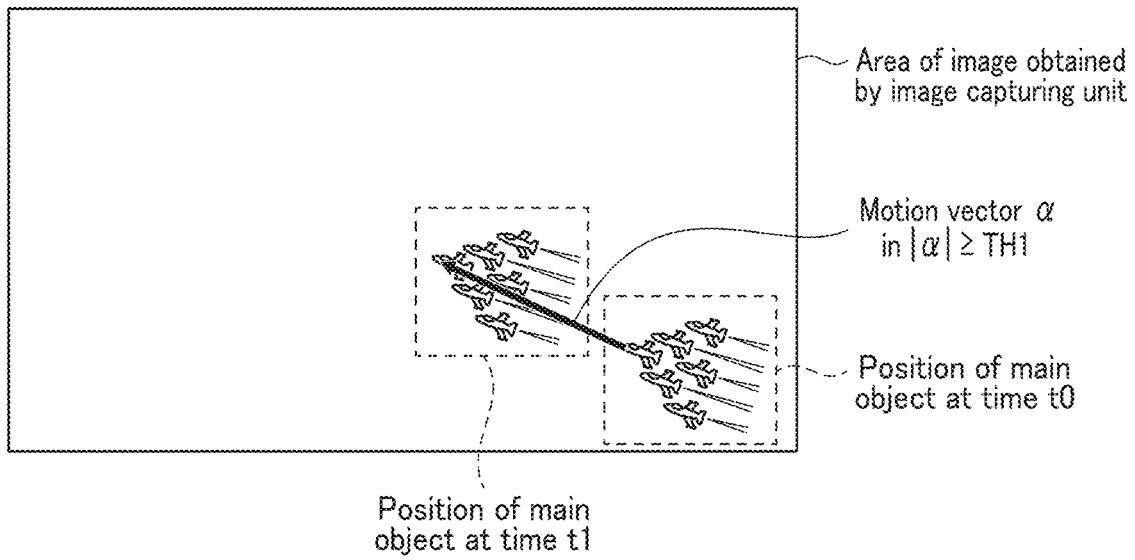
FIG. 4A and FIG. 4B are image diagrams in detecting a state of an object in an image in the image capturing apparatus shown in FIG. 1.
Figure 4B:
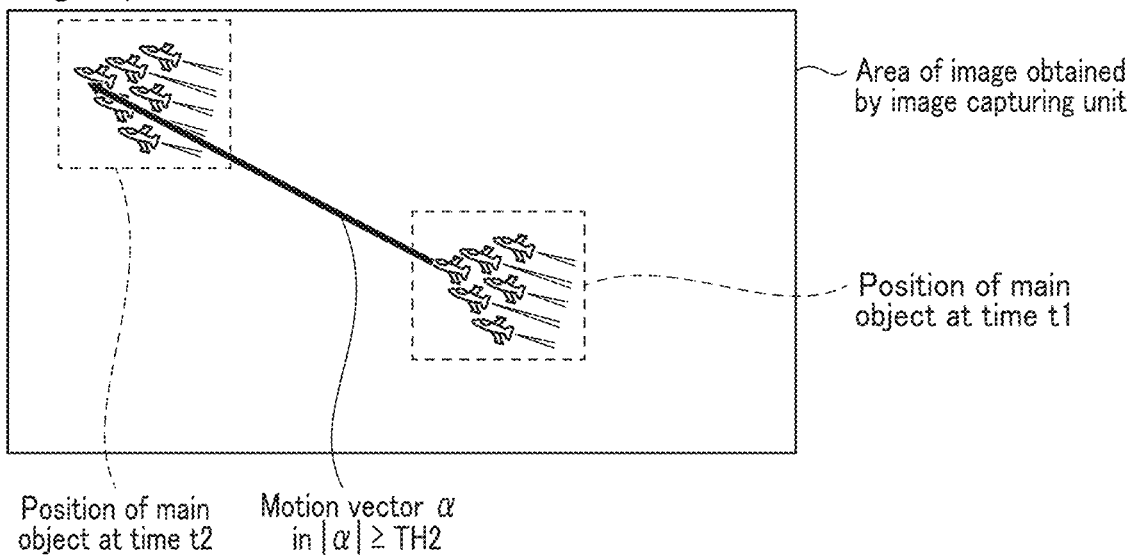

Here, state information about a main object will be described with reference to FIG. 4A and FIG. 4B. FIG. 4A and FIG. 4B are image diagrams in detecting a state of an object in an image in the image capturing apparatus shown in FIG. 1. In this embodiment, a main object (aircrafts in FIG. 4A and FIG. 4B) is a moving object. Then, as the state change of the main object, a first change that is a change equal to or larger than the first threshold and smaller than the second threshold, or a second change that is a change larger than the first change and is equal to or larger than the second threshold is determined. Further, the moving amount of the main object is calculated as the state information about the main object. The moving amount of the main object is a magnitude of a motion vector a of the main object (hereinafter referred to as a "motion vector value $|\alpha|$").

FIG. 4A is the image diagram showing an image obtained by superimposing an image of a frame captured by the image capturing unit 109 at time t0 and an image of a frame captured by the image capturing unit 109 at time t1 in a case where the motion vector value a is equal to or larger than the first threshold TH1. In this embodiment, when the motion vector value a equal to or larger than the first threshold TH1 is detected, the controller 101 detects the state change of the object as the first change, that is, determines that the state change is equal to or larger than the first threshold (Yes in step S305).

FIG. 4B is the image diagram showing an image obtained by superimposing the image of the frame captured by the image capturing unit 109 at the time t1 and an image of a frame captured by the image capturing unit 109 at time t2 in a case where the motion vector value a is equal to or more than the second threshold TH2. The second threshold TH2 is more than the first threshold TH1. When the motion vector value $|\alpha|$ equal to or more than the second threshold TH2 is detected, the controller 101 detects the state change of the object as the second change, that is, determines that the state change is equal to or larger than the second threshold (Yes in step S307). As described above, in this embodiment, the state information about the main object can be quickly and accurately obtained based on the first and second thresholds TH1 and TH2. Although the state information about the main object is information based on the first and second thresholds TH1 and TH2 in this embodiment, this is not limiting. The first and second thresholds TH1 and TH2 are stored in advance in the memory unit 108, for example. The first and second thresholds TH1 and TH2 may be changed properly.

In the step S308, the controller 101 determines whether the notification flag is at the H level. When it is determined in the step S308 that the notification flag is at the H level, the process proceeds to a step S309. In the meantime, when it is determined that the notification flag is not at the H level, that is, the notification flag is at the L level, the process proceeds to a step S315.

In the step S309, the controller 101 counts up the count value of the notification time. The "notification time" is the time elapsed from the time of notification in the step S306.

In a step S310, the controller 101 determines whether the count value of the notification time counted up in the step S309 is equal to or more than a first time period. The "first time period" is a time threshold for the controller 101 to change the control of the image capturing apparatus 100 according to the count value of the notification time. The first time period is, for example, 20 seconds.

Then, when it is determined in the step S310 that the count value of the notification time is equal to or more than the first time period, the process proceeds to a step S311. In the step S311, the controller 101 sets the notification flag to the L level and clears the count value of the notification time.

The process proceeds to the step S311 when the user does not perform an image capturing operation until the first time period elapses. When the user does not perform the image capturing operation until the first time period elapses, it can be determined that a user's intention of image capturing is low. Subsequently, the process proceeds to the step S312.

In the step S312, the controller 101 puts the image capturing unit 109 into the first image capturing state. Thus, the image capturing unit 109 can perform the image pre-capturing in the first image capturing state. When the first image capturing state is set, the power consumption in capturing the pre-capture image can be reduced as described above. After executing the step S312, the process proceeds to a step S314.

Although the first image capturing state is set in the step S312 when the notification time is determined to be equal to or longer than the first time period in the step S310 (when the user does not perform the image capturing operation until the first time elapses) in this embodiment, this is not limiting. For example, the image pre-capturing may be stopped. The stop of the image pre-capturing is also possible, similarly to the change to the first image capturing state, because it can be determined that the user's intention of image capturing is low.

In the meantime, when it is determined in the step S310 that the count value of the notification time is not equal to or more than the first time period, that is, the count value of the notification time is less than the first time period, the process proceeds to a step S313.

In the step S313, the controller 101 puts the image capturing unit 109 into the second image capturing state. Thus, the image capturing unit 109 can perform the image pre-capturing in the second image capturing state. After executing the step S313, the process proceeds to a step S314.

In the step S314, the controller 101 captures a pre-capture image in the capturing state set in the step S312 or S313.

In a step S315, the controller 101 determines whether the count value of the non-operation time is equal to or more than a second time period. The second time period is a time threshold for the controller 101 to change the control of the image capturing apparatus 100 according to the count value of the non-operation time. The second time period is, for example, 60 seconds. When the user does not performed any operation until the second time period elapses, the process is terminated. The process can be terminated because it can be determined that the user is not operating the image capturing apparatus 100. When the process is terminated, the power consumption of the image capturing apparatus 100 can be reduced.

Then, when it is determined in the step S315 that the count value of the non-operation time is equal to or more than the second time period, the process is terminated. In the meantime, when it is determined in the step S315 that the count value of the non-operation time is not equal to or more than the second time period, that is, the count value of the non-operation time is less than the second time period, the process returns to the step S202 (see FIG. 2) and the subsequent steps are sequentially executed.

As described above, the image capturing apparatus 100 starts capturing a pre-capture image when the controller 101 detects the first instruction in the first operation mode (live view state). In the meantime, the image capturing apparatus 100 starts capturing a pre-capture image when it is determined that the state of the object changes on the basis of the state information about the object in the second operation mode (non-live-view state).

As described above, the image capturing apparatus 100 can capture a pre-capture image in any of the first operation mode (live view state) and the second operation mode (non-live-view state). This can reduce the loss of a desired image capturing opportunity even when the user is performing an operation (for example, an operation on the playback screen for playing back an image) different from the image capturing operation on the display unit 110 in the non-live-view state.

For example, the user shall operate the playback screen on the display unit 110 in the non-live-view state when capturing an airplane in flight as an object. In this situation, it is difficult to capture an image of the aircraft in flight at a desired timing. Therefore, when the state of the aircraft changes due to movement of the aircraft in flight, the image capturing apparatus 100 starts capturing a pre-capture image in detecting the change. This can reduce the possibility of failing to capture an image of the aircraft in flight, and as a result, the aircraft in flight can be captured at a desired timing.

Figure 5:
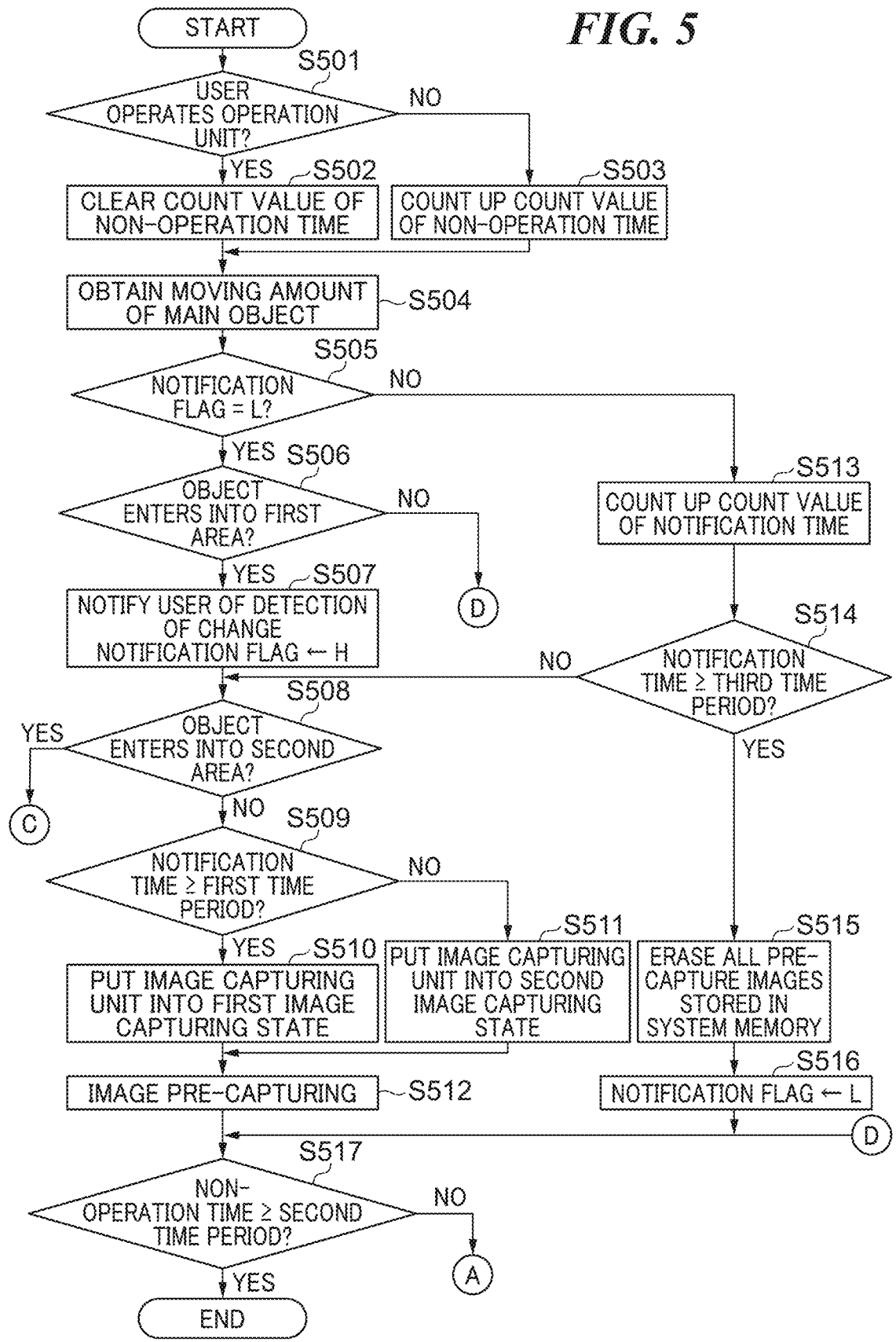
FIG. 5 is a flowchart showing non-live-view state control in an image capturing apparatus according to a second embodiment.

Hereinafter, a second embodiment will be described mainly with reference to FIG. 5, FIG. 6A, FIG. 6B, and FIG. 6C. The description will be made focusing on differences from the first embodiment described above, and the description of the same matters will be omitted. This embodiment is the same as the first embodiment except for the non-live-view state control, that is, the process in the step S213 shown in FIG. 2. FIG. 5 is a flowchart showing the non-live-view state control in the image capturing apparatus according to the second embodiment. As shown in FIG. 5, the controller 101 determines whether a user operates the operation unit 104 in a step S501. When it is determined in the step S501 that the user operates the operation unit 104, the process proceeds to a step S502. In the meantime, when it is not determined in the step S501 that the user operates the operation unit 104, the process proceeds to a step S503.

In the step S502, the controller 101 clears the count value of the non-operation time. After executing the step S502, the process proceeds to a step S504.

In the step S503, the controller 101 counts up the count value of the non-operation time. After executing the step S503, the process proceeds to the step S504.

In the step S504, the controller 101 obtains state information about a main object in the image based on the image obtained by the image capturing unit 109.

Figure 6A:
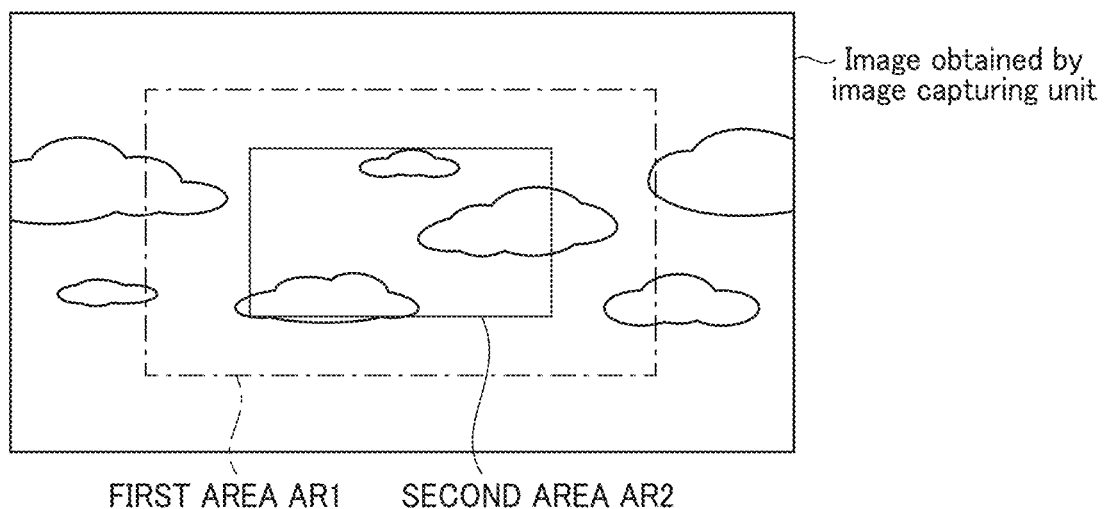
FIG. 6A, FIG. 6B, and FIG. 6C are image diagrams in detecting a state of an object in an image in the image capturing apparatus according to the second embodiment.
Figure 6B:
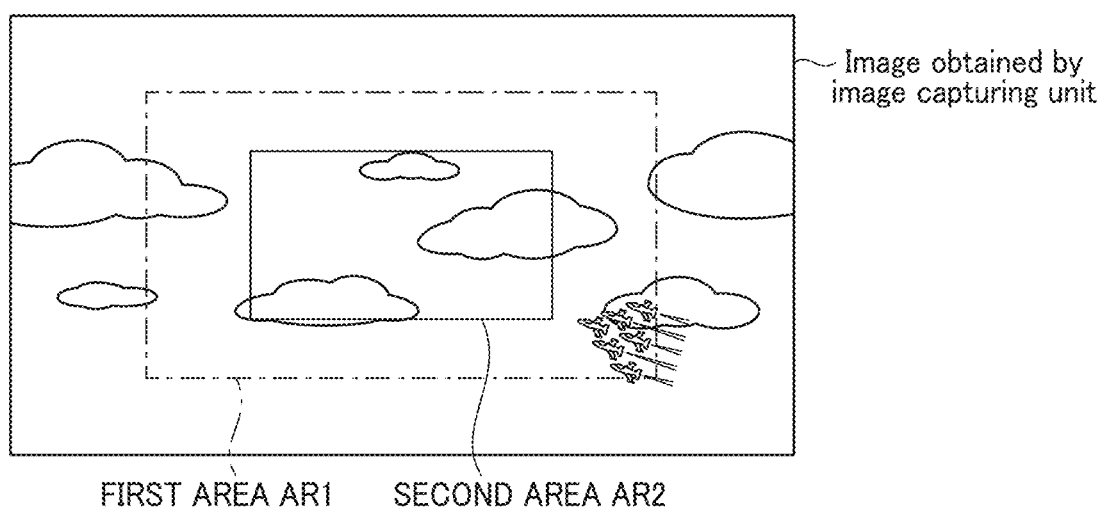
Figure 6C:
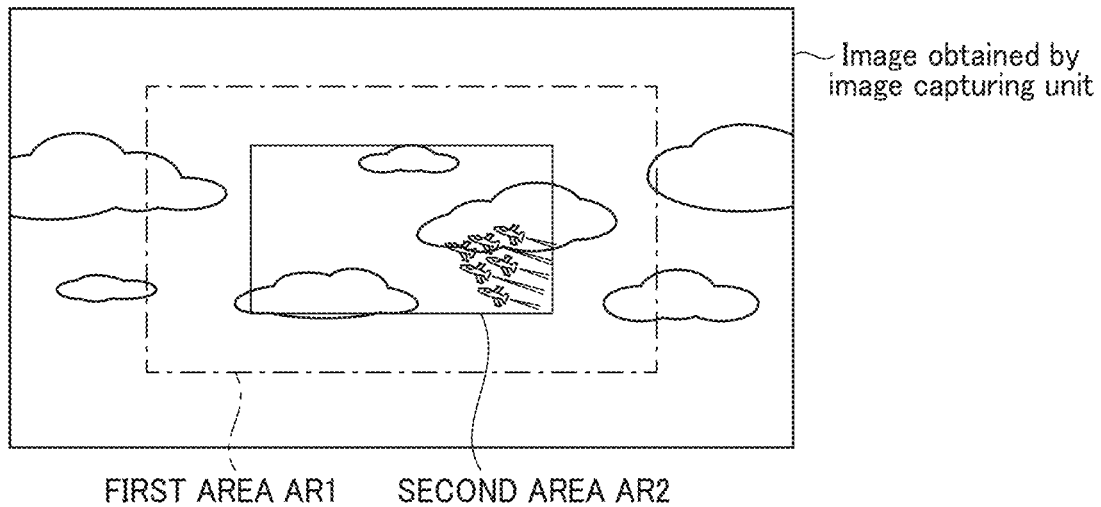

Here, the state information about the main object in this embodiment will be described with reference to FIG. 6A, FIG. 6B, and FIG. 6C. FIG. 6A, FIG. 6B, and FIG. 6C are image diagrams in detecting a state of an object in an image in the image capturing apparatus according to the second embodiment.

FIG. 6A is the image diagram in which a first area AR1 and a second area AR2 are superimposed in the image obtained by the image capturing unit 109. The first area AR1 and the second area AR2 are different in position and size from each other. In this embodiment, the first area AR1 and the second region AR2 have the same rectangular shape, but the second area AR2 is smaller than the first area AR1 and is located inside the first area AR1. The first area AR1 and the second area AR2 are arranged concentrically with the center of the image.

FIG. 6B is the image diagram in which the main object moves into the first area AR1 beyond a boundary line of the first area AR1. In this embodiment, when the main object moves into the first area AR1, the controller 101 detects the state of the main object as the first change, that is, determines that the first change occurs (Yes in a step S506).

FIG. 6C is the image diagram in which the main object moves into the second area AR2 that is more central in the image than the first area AR1 beyond a boundary line of the second area AR2. In this embodiment, when the main object moves into the second area AR2, the controller 101 detects the state of the main object as the second change, that is, determines that the second change occurs (Yes in a step S508). As described above, in this embodiment, the state information about the main object can be quickly and accurately obtained based on the first area AR1 and the second area AR2.

Although the state information about the main object is the information based on the first area AR1 and the second area AR2 in this embodiment, this is not limiting. The first area AR1 and the second area AR2 are stored in advance in the memory unit 108, for example, and are set in the image when the state about the object is detected. The position, size, shape, and the like of each of the first area AR1 and the second area AR2 may be may be changed properly.

In a step S505, the controller 101 determines whether the notification flag is at the L level. When it is determined in the step S505 that the notification flag is at the L level, the process proceeds to a step S506. In the meantime, when it is determined in the step S505 that the notification flag is not at the L level, that is, the notification flag is at the H level, the process proceeds to a step S513.

In the step S506, the controller 101 determines whether the first change occurs, that is, whether the main object enters into the first area AR1, on the basis of the state information about the main object obtained in the step S504. When it is determined in the step S506 that the first change occurs, the process proceeds to a step S507. In the meantime, when it is determined in the step S506 that there is no first change, the process proceeds to a step S517.

In the step S507, the controller 101 controls the notification unit 111 to notify the user that the first change is detected. In the step S507, the controller 101 sets the notification flag to the H level.

In a step S508, the controller 101 determines whether the second change occurs, that is, whether the main object enters into the second area AR2, on the basis of the state information about the object obtained in the step S504. When it is determined in the step S508 that the second change occurs, the process proceeds to the step S207 (see FIG. 2). In the meantime, when it is determined in the step S508 that there is no second change, the process proceeds to a step S509.

In the step S509, the controller 101 determines whether the count value of the notification time is equal to or more than the first time period. Since the first time period is the same as that described about the step S310 (see FIG. 3), the description thereof will be omitted. Then, when it is determined in the step S509 that the count value of the notification time is equal to or more than the first time period, the process proceeds to a step S510. In the meantime, when it is determined in the step S509 that the count value of the notification time is not equal to or more than the first time period, that is, the count value of the notification time is less than the first time period, the process proceeds to a step S511.

In the step S510, the controller 101 puts the image capturing unit 109 into the first image capturing state. This allows the image capturing unit 109 to perform the image pre-capturing in the first image capturing state. After executing the step S510, the process proceeds to a step S512.

In the step S511, the controller 101 puts the image capturing unit 109 into the second image capturing state. This allows the image capturing unit 109 to perform the image pre-capturing in the second image capturing state. After executing the step S511, the process proceeds to the step S512.

In the step S512, the controller 101 performs the image pre-capturing in the image capturing state set in the step S510 or S511. After executing the step S512, the process proceeds to the step S517.

In the step S513 after executing the step S505, the controller 101 counts up the count value of the notification time.

In a step S514, the controller 101 determines whether the count value of the notification time counted up in the step S513 is equal to or more than a third time period. The third time period is a time threshold for the controller 101 to change the control of the image capturing apparatus 100 according to the count value of the notification time. The third time period is, for example, 40 seconds.

Then, when it is determined in the step S514 that the count value of the notification time is not equal to or more than the third time period, the process returns to the step S508, and the subsequent steps are sequentially executed. In the meantime, when it is determined in the step S514 that the count value of the notification time is equal to or more than the third time period, the process proceeds to a step S515.

In the step S515, the controller 101 erases all the pre-capture images stored in the system memory 106.

In a step S516, the controller 101 sets the notification flag to the L level. After executing the step S516, the process proceeds to the step S517.

After the notification in the step S507, the image pre-capturing in the second image capturing state continues until the third time period elapses. Then, if the user does not perform the image capturing operation until the third time period elapses, the image pre-capturing is stopped. The state in which the user does not perform the image capturing operation until the third time period elapses can be determined that the user has a low image capturing intention, and thus the image pre-capturing can be stopped. In addition, the power consumption is reduced by stopping the image pre-capturing.

In the step S517, the controller 101 determines whether the count value of the non-operation time is equal to or more than the second time period. Since the second time period is the same as that described about the step S315 (see FIG. 3), the description thereof will be omitted. When it is determined in the step S517 that the count value of the non-operation time is equal to or larger than the second time period, the process is terminated. In the meantime, when it is determined in the step S517 that the count value of the non-operation time is less than the second time period, the process returns to the step S202 (FIG. 2), and the subsequent steps are sequentially executed.

As described above, the image capturing apparatus 100 can stop capturing of the pre-capture image when the state of the object does not change in the non-live-view state of the display unit 110. This can reduce power consumption of the image capturing apparatus 100. In addition, when the state of the object changes in the non-live-view state of the display unit 110, that is, when a change of the object occurs, the pre-capture image can be captured. This can reduce the loss of desired image capturing opportunity.

Although the preferred embodiments of the present invention have been described above, the present invention is not limited to the above-described embodiments, and various modifications and changes can be made within the scope of the gist of the present invention. The present invention is also applicable to an electronic apparatus including the function of the image capturing apparatus 100.

Although the state information about the object is detected using the image capturing unit 109, that is, based on the image captured by the image capturing unit 109 in each embodiment, the present invention is not limited thereto. For example, the state information about the object may be detected using an event sensor, a TOF sensor, or an image sensor different from the image capturing unit 109.

The image capturing apparatus 100 may include a recognition unit that recognizes a predetermined object. The recognition unit is not particularly limited, and for example, a learning model that learns a predetermined object can be used. Thus, the controller 101 can detect the predetermined object on the basis of the recognition result of the recognition unit. Then, when the predetermined object is detected, the state of the object is determined to be the first state. And when the moving amount of the predetermined object becomes equal to or more than the threshold, the state of the object is determined to be the second state. The image capturing apparatus 100 can also perform Such a determination. It is preferable that the recognition unit can change the predetermined object properly. Thus, the predetermined object can be set according to the user's preference.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-088746, filed May 30, 2023, which is hereby incorporated by reference herein in its entirety.

What is claimed is:

1. An image capturing apparatus comprising:
an image capturing unit configured to output image data;
a memory device that stores a set of instructions; and
at least one processor that executes the set of instructions to:
in a first operation mode in an pre-capturing mode,
display image data sequentially output from the image capturing unit as a live view image on a display unit;
hold pre-capture image data output from the image capturing unit during a period from detection of a first instruction instructing image capturing preparation to detection of a second instruction instructing recording of a captured image; and
record main image data output from the image capturing unit in response to the second instruction and the held pre-capture image data in a recording medium when the second instruction is detected,
in a second operation mode in the pre-capturing mode,
stop displaying the live view image on the display unit;
detect a change of an object based on the image data; and
hold the image data output from the image capturing unit based on a detection result.

2. The image capturing apparatus according to claim 1, wherein the at least one processor executes instructions to:
detect a change of the object as a first change in a case where a moving amount of the object is equal to or more than a first threshold;
detect a change of the object as a second change in a case where the moving amount of the object is equal to or more than a second threshold that is more than the first threshold;
hold pre-capture image data output from the image capturing unit during a period from detection of the first change to detection of the second change; and
record the main image data output from the image capturing unit in detecting the second change and the held pre-capture image data in a recording medium in a case where the second change is detected.

3. The image capturing apparatus according to claim 1, wherein the at least one processor executes instructions to:
detect a change of the object as a first change in a case where the object moves beyond a boundary line of a first area in the image data;
detect a change of the object as a second change in a case where the object moves beyond a boundary line of a second area different from the first area;
hold pre-capture image data output from the image capturing unit during a period from detection of the first change to detection of the second change; and
record the main image data output from the image capturing unit in detecting the second change and the held pre-capture image data in a recording medium in a case where the second change is detected.

4. The image capturing apparatus according to claim 1, wherein the at least one processor executes instructions to:

detect a first change in a case where a predetermined object is detected as the object;

detect a change of the object as a second change in a case where a moving amount of the predetermined object is equal to or more than a threshold;

hold pre-capture image data output from the image capturing unit during a period from detection of the first change to detection of the second change; and record the main image data output from the image capturing unit in detecting the second change and the held pre-capture image data in a recording medium in a case where the second change is detected.

5. The image capturing apparatus according to claim 4, wherein the at least one processor executes instructions to:

recognize the predetermined object; and detect the predetermined object based on a recognition result.

6. The image capturing apparatus of claim 5, wherein the at least one processor executes instructions to change the predetermined object.

7. The image capturing apparatus according to claim 1, wherein the at least one processor executes instructions to enable control in the second operation mode in a case where the second change is detected after the first change is detected.

8. The image capturing apparatus according to claim 1, wherein the image capturing unit is capable of taking a first image capturing state and a second image capturing state in which image capturing conditions are different from each other, and wherein at least one of the image capturing conditions including image quality, a frame rate, and a number of captured images in the first image capturing state is reduced compared to that in the second image capturing state, and wherein the at least one processor executes instructions to put the image capturing unit into the second image capturing state in a case where a change of the object is detected, and put the image capturing unit into the first image capturing state in a case where an operation to the image capturing apparatus is not performed for a predetermined time period.

9. The image capturing apparatus according to claim 1, further comprising a notification unit configured to notify a user of detection of a change of the object in a case where the change of the object is detected.

10. The image capturing apparatus according to claim 9, wherein the notification unit can generate at least one of light, sound, and vibration in notifying that the change of the object is detected.

11. The image capturing apparatus according to claim 1, wherein the at least one processor executes instructions to stop image capturing by the image capturing unit in a case where an operation on the image capturing apparatus is not performed for a predetermined time after detecting the change of the object.

12. The image capturing apparatus according to claim 1, wherein the at least one processor executes instructions to stop image capturing by the image capturing unit in a case where an operation on the image capturing apparatus is not performed for a predetermined time in the second operation mode.

13. The image capturing apparatus according to claim 1, further comprising a recording unit configured to record image data captured by the image capturing unit, wherein the recording unit includes a first recording section to record the image data in the first operation mode and a second recording section to record the image data in the second operation mode.

14. The image capturing apparatus according to claim 1, further comprising an operation member operated by pressing, wherein the operation member corresponds to a two-step press operation, and wherein the first instruction is output when the operation member is pressed in a first step and the second instruction is output when the operation member is pressed in a second step.

15. The image capturing apparatus according to claim 1, further comprising the display unit configured to display image data output from the image capturing unit, wherein the display unit can take a live view state in which the live view image is displayed in the first operation mode and a non-live-view state in which the live view image is not displayed in the second operation mode.

16. A control method for an image capturing apparatus including an image capturing unit outputting image data, the method comprising:

in a first operation mode in an pre-capturing mode, displaying image data sequentially output from the image capturing unit as a live view image on a display unit;

holding pre-capture image data output from the image capturing unit during a period from detection of a first instruction instructing image capturing preparation to detection of a second instruction instructing recording of a captured image; and recording main image data output from the image capturing unit in response to the second instruction and the held pre-capture image data in a recording medium when the second instruction is detected, in a second operation mode in the pre-capturing mode, stopping displaying the live view image on the display unit;

detecting a change of an object based on the image data; and holding pre-capture image data output from the image capturing unit according to information about the change of the object.

17. A non-transitory computer-readable storage medium storing a control program causing a computer to execute a control method for an image capturing apparatus including an image capturing unit outputting image data, the method comprising:

in a first operation mode in an pre-capturing mode, displaying image data sequentially output from the image capturing unit as a live view image on a display unit;

holding pre-capture image data output from the image capturing unit during a period from detection of a first instruction instructing image capturing preparation to detection of a second instruction instructing recording of a captured image; and recording main image data output from the image capturing unit in response to the second instruction and the held pre-capture image data in a recording medium when the second instruction is detected, in a second operation mode in the pre-capturing mode, stopping displaying the live view image on the display unit;

detecting a change of an object based on the image data; and holding pre-capture image data output from the image capturing unit according to information about the change of the object.

\* \* \* \* \*